Feb. 26, 1929.
D. J. BRIMM, JR
1,703,222
AEROPLANE LANDING GEAR
Filed March 10, 1927
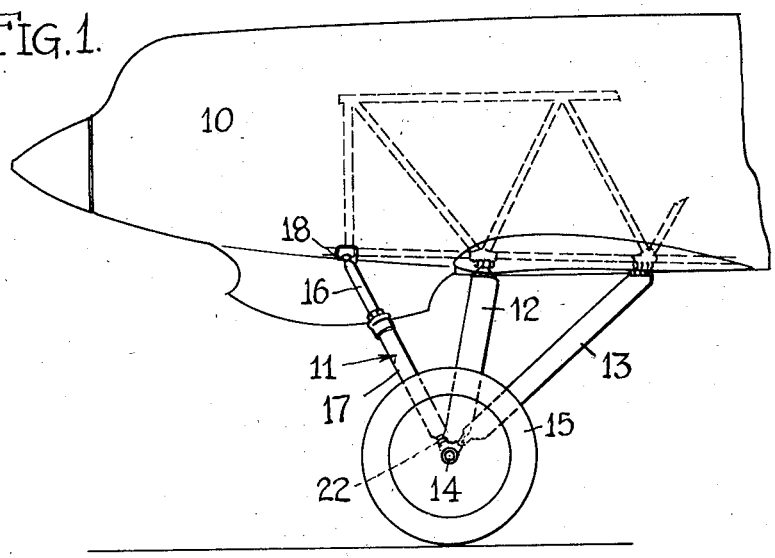
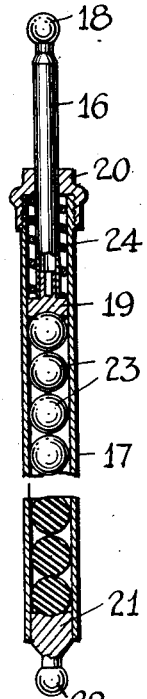
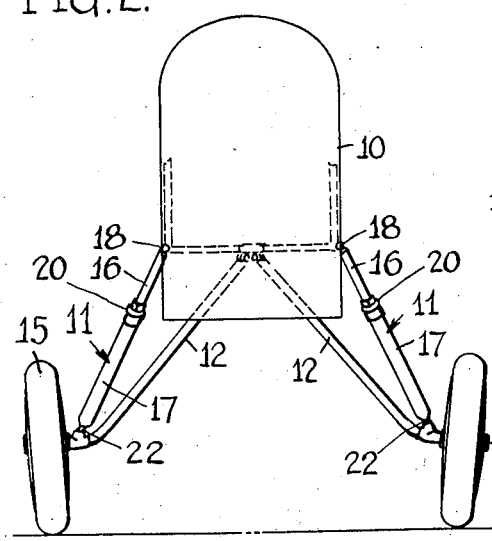
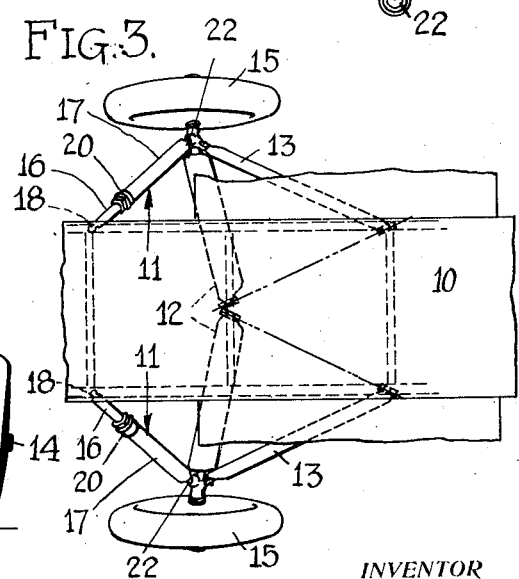
INVENTOR
DANIEL J. BRIMM JR
BY
ATTORNEY Patented Feb. 26, 1929.

1,703,222

UNITED STATES PATENT OFFICE.

DANIEL J. BRIMM, JR., OF WEST HEMPSTEAD, NEW YORK, ASSIGNOR TO IRELAND AIRCRAFT INC., A CORPORATION OF NEW YORK.

AEROPLANE LANDING GEAR.

Application filed March 10, 1927. Serial No. 174,214.

My invention relates to aeroplane landing gears and is more particularly concerned with landing gear shock absorbers.

In aeroplane landing gears, where rubber in compression is used as the shock absorbing agent, it has been the practice heretofore to provide and interpose between the relatively movable landing gear parts a plurality of separate rubber discs or "washers" as they are sometimes called. Now the disadvantages of a shock absorber thus characterized are several. In the first place, the rubber discs, the moment the operating or impact load is removed therefrom, simultaneously expand and hence simultaneously resume their original shape or condition. In the second place, rubber discs, when used, require that a rod or other element be carried thru the center thereof to prevent the rubber mass from buckling. In the third place if, as is usually the case, the shock absorber is enclosed, the enclosing structure must, to make room for the lateral expansion of the discs, be made large enough not only to receive said discs, but large enough in addition to admit of disc expansion. And finally, in view of the accessory structure required, disc type shock absorbers are not only heavy but are expensive to manufacture as well.

An object of the present invention is to simplify the landing gear of an aeroplane and at the same time eliminate the disadvantages above pointed out. Instead of using rubber discs or washers in compression, resilient spheres or balls are used. Preferably the spheres or balls are completely enclosed in one of the legs or sections of a telescopic strut. By actual test I have discovered that a plurality of rubber balls of approximately one one-half inches in diameter, when suitably enclosed and placed one upon the other, will not only sustain aeroplane weighing approximately 2200 pounds net, but will even under the most trying conditions, adequately absorb and dissipate all landing and operating shocks. Under compres on, the balls or spheres, uniformly and simultaneously flatten out and, as the inside diameter of the enclosing struction is preferably substantially equal to the over-all diameter of the superimposed balls, obviously said balls, when flattened, frictionally engage and bind firmly against the enclosing wall of the strut. Consequently, when the compression load is removed, the sphere or balls, instead of expanding or resuming their original shape simultaneously, expand successively, beginning with the uppermost and following thru until the bottom sphere has resumed its original shape. This successive expansion, as distinguished from the simultaneous expansion encountered in the use of discs, is due principally, if not entirely, to the fact that from the topmost ball downwardly, each succeeding ball can not expand until the ball next above shall have resumed its original shape. The frictional contact between each ball and the enclosing strut wall acts as a stop. Moreover, by using balls or spheres instead of discs, a small diameter strut can be safely employed and at the same time the use of a center rod to prevent buckling is wholly eliminated. A lighter, better and cheaper landing gear shock absorber is the result.

In the drawings, wherein like reference characters denote like or corresponding parts, Fig. 1 is a side elevation of the forward portion of an aeroplane having the landing gear of my invention mounted therebeneath;

Fig. 2 is a front end elevation of the structure illustrated in Fig. 1;

Fig. 3 is a plan view, and

Fig. 4 is a detail longitudinal sectional view of one of the telescoping struts.

In the embodiment of the invention selected for illustration an aeroplane of more or less conventional appearance is shown. The fuselage or body of said aeroplane is designated as 10. To said fuselage or body 10 the struts of the landing gear are attached. Preferably the landing gear comprises backwardly and outwardly inclined forward struts 11, outwardly and slightly forwardly inclined center struts 12, and outwardly and forwardly inclined rear struts 13. The center struts 12, at their outer ends, are shaped to provide axle stubs 14 upon which the wheels 15 of the landing gear are mounted.

The forward struts 11 of the landing gear, unlike the remaining struts 12 and 13 therefore are divided. Each said strut comprises a strut section or leg 16 of small diameter and a strut section or leg 17 of large diameter. Said strut sections or legs telescope one within the other, and in the operation of the landing gear, the telescopic movement thereof is resisted by the shock absorbing means. The strut section 16 of small diameter may or may not be of hollow section. At its upper end it is fastened as by a ball and socket joint 18 to the fuselage and at its opposite end it is provided with an adjustable head piece 19 which engages within and is adapted to slide back and forth within the large diameter strut section 17. Said large diameter strut section 17 is hollow and of uniform inside diameter throughout. At its upper end it is provided with a cap 20 threaded thereon and thru which the strut section of small diameter extends, and at its opposite end it is plugged as at 21 and fastened as by a ball and socket joint 22 to one or the other of the axle stubs 14.

Within each said large diameter strut section 17 a plurality of rubber balls or spheres 23 are enclosed. These balls 23 are of a diameter substantially equal to the inside diameter of said strut section 17 and are placed one upon the other in such manner as to fill to a substantial depth the hollow of said strut section. At one end, said tier or column of balls 23 bear directly on the head piece 19 of the small diameter strut section and at its opposite end said tier or column of balls bear directly on the plug or closure 21 at the foot of the strut. Collectively said balls or spheres 23, by their resistance to compression, yieldingly restrain the telescopic movement of the mating strut sections 16 and 17.

As a means of absorbing rebound shocks, a spring 24 may be provided on the inside of the large diameter strut section to bear at its opposite ends respectively upon the head piece 19 and the cap 20. This spring it will be noted encircles that portion of the small diameter strut section 16 extended into the strut section 17 of large diameter. Moreover, if desired, said large diameter strut section may be partially oil filled to continuously lubricate the moving or rubbing parts of the telescoping strut.

A landing gear thus characterized, and as above pointed out, is advantageous in that upon the removal of the landing or impact load, the balls or spheres 23, instead of simultaneously expanding to their original shape or condition, expand successively beginning at the top of the ball column and following throughout. This advantage, together with the advantage resulting from the decreased cross-sectional area of the rubber column, as well as the decreased production cost, make it (the landing gear) very desirable indeed.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What I claim is:

1. In an aeroplane landing gear, a center strut pivotally fastened at one end to the aeroplane structure at a point in the vicinity of the longitudinal vertical plane of its fore and aft axis, a wheel mounted at the outer end of said strut, a rear strut fastened at its outer end to said center strut, said rear strut at its inner end being pivotally fastened to the aeroplane structure at a point laterally removed from said plane and in a manner such that its pivot axis constitutes a diagonally substantially straight line continuation of the pivot axis of said center strut, a divided forward strut having its sections telescopically engaging one within the other, said forward strut at its opposite ends having a universal connection with said center strut and with said aeroplane structure respectively, and means within the embrace of the divided strut to yieldingly resist both the simultaneous pivotal movement of said rear and said center struts and the telescopic movement of said divided strut.

2. In an aeroplane landing gear, a center strut pivotally fastened at one end to the aeroplane structure, a wheel mounted at the outer end of said strut, a rear strut fastened at its outer end to said center strut, said rear strut at its inner end being pivotally fastened to the aeroplane structure in a manner such that its pivot axis constitutes a straight line continuation of the pivot axis of said center strut, a divided forward strut having its sections telescopically engaging one within the other, said forward strut at its opposite ends having a universal connection with said center strut and with said aeroplane structure respectively, and a plurality of solid resilient spheres engaging one upon the other within one of said divided strut sections to yieldingly resist both the simultaneous pivotal movement of said rear and said center struts and the telescopic movement of said divided strut, said spheres, in each instance, having an over-all diameter substantially equal to the inside diameter of the enclosing strut section to frictionally engage therewith when compressed.

In testimony whereof I hereunto affix my signature.

DANIEL J. BRIMM, Jr.